United States Patent
Sugita et al.

(10) Patent No.: US 10,093,162 B2
(45) Date of Patent: Oct. 9, 2018

(54) ENGINE SUSPENSION SYSTEM

(71) Applicant: TOYOTA JIDOSHA KABUSHIKI KAISHA, Toyota-shi, Aichi-ken (JP)

(72) Inventors: Yusuke Sugita, Toyota (JP); Hideki Murata, Nagoya (JP); Nobuya Yoshida, Toyota (JP); Hiroshi Miya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/040,870

(22) Filed: Feb. 10, 2016

(65) Prior Publication Data

US 2016/0236560 A1    Aug. 18, 2016

(30) Foreign Application Priority Data

Feb. 16, 2015   (JP) ................. 2015-027649

(51) Int. Cl.
*B60K 5/12*    (2006.01)

(52) U.S. Cl.
CPC .......... *B60K 5/1283* (2013.01); *B60K 5/1208* (2013.01)

(58) Field of Classification Search
CPC ......... F16F 1308/08; F16F 1308/26; B60K 5/1283; B60G 7/02; B60G 13/06; B60G 13/08; B60G 17/0152; B60G 17/0195; B60G 2200/462; B60G 2202/24; B60G 2204/62; B60G 2204/1431; B60G 2400/32; B60G 2400/106; B60G 2400/204

USPC ..................................................... 267/140.14
See application file for complete search history.

(56) References Cited

U.S. PATENT DOCUMENTS

| 6,176,477 | B1 * | 1/2001 | Takeo | ............. F16F 13/105 |
| | | | | 267/140.11 |
| 2003/0030203 | A1 * | 2/2003 | Nemoto | ............ F16F 13/26 |
| | | | | 267/140.14 |
| 2005/0200061 | A1 * | 9/2005 | Nemoto | ............. B60K 6/485 |
| | | | | 267/140.14 |
| 2009/0145210 | A1 * | 6/2009 | Suzuki | .............. G01M 15/11 |
| | | | | 73/114.04 |

(Continued)

FOREIGN PATENT DOCUMENTS

| JP | H05-060169 A | 3/1993 |
| JP | H05-139165 A | 6/1993 |

(Continued)

*Primary Examiner* — Robert A. Siconolfi
*Assistant Examiner* — San M Aung
(74) *Attorney, Agent, or Firm* — Oliff PLC (57) ABSTRACT

A suspension system for an engine includes an engine mount and an electronic control unit. The engine mount has spring characteristics that are switchable between first spring characteristics and second spring characteristics. The electronic control unit is configured to switch the spring characteristics of the engine mount to the first spring characteristics when the rotational speed of the engine is lower than a predetermined rotational speed, and torque of the engine is equal to or larger than a predetermined torque. The electronic control unit is configured to switch the spring characteristics of the engine mount to the second spring characteristics when the rotational speed of the engine is lower than the predetermined rotational speed, and the torque of the engine is smaller than the predetermined torque.

14 Claims, 4 Drawing Sheets

(56) References Cited

U.S. PATENT DOCUMENTS

| | | | | |
|---|---|---|---|---|
| 2009/0151469 A1* | 6/2009 | Suzuki | ............... | B60W 20/50 |
| | | | | 73/847 |
| 2011/0042872 A1* | 2/2011 | Hasegawa | ............... | F16F 13/26 |
| | | | | 267/140.14 |
| 2015/0046031 A1* | 2/2015 | Gagliano | ........... | B60G 17/0152 |
| | | | | 701/37 |
| 2015/0054209 A1* | 2/2015 | Eckel | ...................... | F16F 13/08 |
| | | | | 267/140.14 |

FOREIGN PATENT DOCUMENTS

| | | |
|---|---|---|
| JP | 2001-253251 A | 9/2001 |
| JP | 2005-256933 A | 9/2005 |
| JP | 2009-068528 A | 4/2009 |
| JP | 2011-080492 A | 4/2011 |
| JP | 2011-218923 A | 11/2011 |

\* cited by examiner

ENGINE SUSPENSION SYSTEM

INCORPORATION BY REFERENCE

The disclosure of Japanese Patent Application No. 2015-027649 filed on Feb. 16, 2015 including the specification, drawings and abstract is incorporated herein by reference in its entirety.

BACKGROUND

1. Technical Field

The disclosure relates to a suspension system for an engine.

2. Description of Related Art

A suspension system for an engine in a vehicle includes an engine mount that supports the engine on the vehicle. The engine mount has the function of curbing transmission of engine vibration to the vehicle side, and damping vibration transmitted from a road surface to the vehicle. In the engine mount, the capability of curbing transmission of engine vibration to the vehicle side is enhanced as the spring constant of the engine mount is smaller. On the other hand, in the engine mount, the capability of damping vibration transmitted from the road surface to the vehicle is enhanced as the damping coefficient of the engine mount is larger.

In Japanese Patent Application Publication No. 2011-80492 (JP 2011-80492 A), the relationship between the spring constant and the damping coefficient of an engine mount when the engine mount is tuned to predetermined spring characteristics is disclosed. More specifically, the relationship between changes in the spring constant and changes in the damping coefficient with increase of the frequency of engine vibration, under a condition where the engine mount is tuned to the predetermined spring characteristics, is disclosed. In the engine mount tuned to the predetermined spring characteristics, the frequency at which the spring constant is maximized and the frequency at which the damping coefficient is maximized are close to each other. Further, if the spring characteristics of the engine mount are changed, the frequency at which the spring constant is maximized and the frequency at which the damping coefficient is maximized are kept close to each other, but the trend in change of the spring constant and the trend in change of the damping coefficient relative to the frequency shift or change with the frequency in synchronization with each other.

Figure 5:
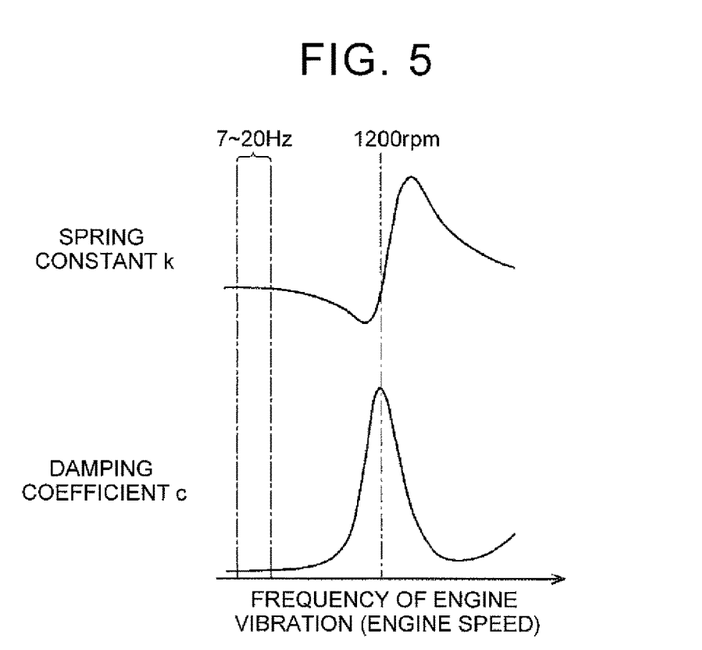
FIG. 5 is a graph indicating changes in the spring constant k and damping coefficient c of the engine mount having first spring characteristics, relative to change of the frequency of engine vibration.

FIG. 5 shows an example of change of the spring constant k and change of the damping coefficient c with change in the frequency of engine vibration when the engine mount is tuned to given spring characteristics (which will be called "first spring characteristics"). The frequency of engine vibration increases as the engine speed increases. When the engine mount is tuned to the first spring characteristics, the frequency at which the spring constant k is maximized and the frequency at which the damping coefficient c is maximized are close to each other, and these frequencies are relatively large values.

Figure 6:
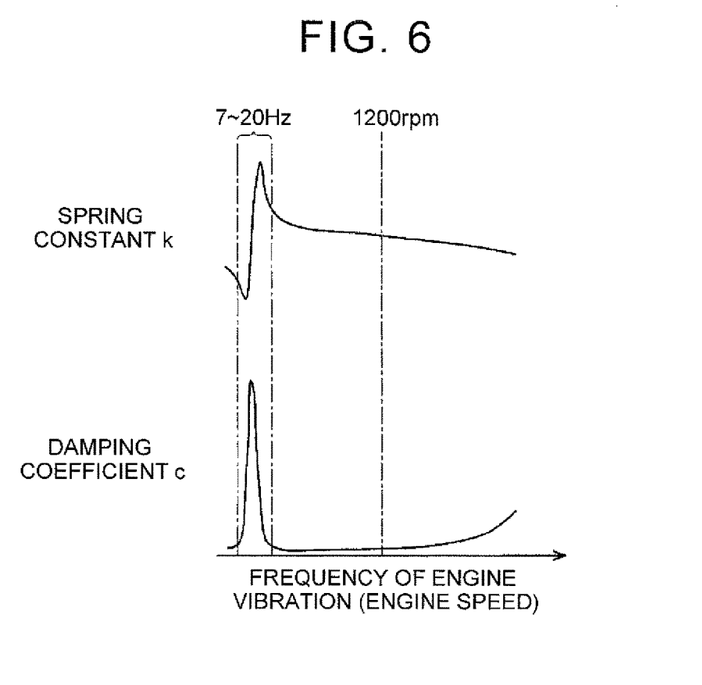
FIG. 6 is a graph indicating changes in the spring constant k and damping coefficient c of the engine mount having second spring characteristics, relative to change of the frequency of engine vibration.

FIG. 6 shows an example of change of the spring constant k and change of the damping coefficient c with change in the frequency of engine vibration when the engine mount is tuned to given spring characteristics (which will be called "second spring characteristics") that are different from the first spring characteristics. When the engine mount is tuned to the second spring characteristics, the frequency at which the spring constant k is maximized and the frequency at which the damping coefficient c is maximized are close to each other, and these frequencies are relatively small values.

In the meantime, an occupant of the vehicle may feel uncomfortable when engine vibration is transmitted to the vehicle side. Accordingly, in order to curb transmission of engine vibration to the vehicle side as much as possible, it is desirable to enhance the capability of curbing transmission of engine vibration to the vehicle side in the engine mount over the entire change region of the engine speed, in other words, to reduce the spring constant k of the engine mount over the entire change region of the engine speed.

To achieve the above condition, it may be considered to employ a technology as disclosed in Japanese Patent Application Publication No. 5-139165 (JP 5-139165 A) for switching spring characteristics of the engine mount according to the engine speed, and switch the spring characteristics in the following manner. Namely, the spring characteristics of the engine mount are switched to the first spring characteristics (FIG. 5) when the engine speed is low (e.g., lower than 1200 rpm), whereas the spring characteristics of the engine mount are switched to the second spring characteristics (FIG. 6) when the engine speed is high (e.g., equal to or higher than 1200 rpm).

By switching the spring characteristics of the engine mount according to the engine speed, it is possible to reduce the spring constant k of the engine mount over the entire change region of the engine speed, and enhance the capability of curbing transmission of engine vibration to the vehicle side in the engine mount. Accordingly, engine vibration is less likely or unlikely to be transmitted to the vehicle side, over the entire change region of the engine speed, and the occupant of the vehicle is less likely or unlikely to feel uncomfortable due to the transmission of the vibration.

SUMMARY

In the meantime, in a region in which the engine speed is low, namely, in a region in which the frequency of engine vibration is low, there is a frequency region (in this example, 7-20 Hz) in which vibration transmitted from a road surface to the vehicle side during traveling of the vehicle resonates with vibration of the engine itself. If the resonance occurs, the vehicle shakes largely, and an occupant of the vehicle feels uncomfortable. In order to suppress the uncomfortable feeling of the occupant caused by the resonance, it is useful to increase the damping coefficient c of the engine mount, and enhance the performance of the engine mount, i.e., its capability of damping vibration transmitted from the road surface to the vehicle.

However, when the engine speed is low, the spring characteristics of the engine mount are switched to the first spring characteristics (FIG. 5), so as to make it less likely or unlikely for the occupant to feel uncomfortable due to transmission of engine vibration to the vehicle side. Therefore, the damping coefficient c of the engine mount is reduced in the frequency region in which the resonance occurs. Namely, the engine mount's capability of damping vibration transmitted from the road surface to the vehicle is reduced. Accordingly, when the engine speed is low, the resonance occurs in the above-indicated frequency region, and the occupant of the vehicle feels uncomfortable. Thus, there is same room for further improvement in terms of suppression of the uncomfortable feeling of the occupant caused by the resonance.

The disclosed embodiments provide a suspension system for an engine, which makes it less likely or unlikely for an occupant to feel uncomfortable due to vibration of the engine and due to resonance of vibration transmitted from a road surface to the vehicle when the engine speed is low.

A suspension system for an engine according to one aspect includes an engine mount and an electronic control unit. The engine mount supports the engine on a vehicle. The engine mount has spring characteristics that are switchable between first spring characteristics and second spring characteristics. The second spring characteristics provide a larger damping coefficient and a larger spring constant than the first spring characteristics when a rotational speed of the engine is lower than a predetermined rotational speed. The electronic control unit is configured to switch the spring characteristics of the engine mount to the first spring characteristics when the rotational speed of the engine is lower than the predetermined rotational speed, and torque of the engine is equal to or larger than a predetermined torque. The electronic control unit is configured to switch the spring characteristics of the engine mount to the second spring characteristics when the rotational speed of the engine is lower than the predetermined rotational speed, and the torque of the engine is smaller than the predetermined torque.

When the engine speed is lower than the predetermined rotational speed, engine vibration increases as torque of the engine is larger. Thus, in order to prevent the occupant of the vehicle from feeling uncomfortable due to the engine vibration transmitted to the vehicle side, when the engine speed is lower than the predetermined rotational speed, and the torque of the engine is equal to or larger than the predetermined torque, the spring characteristics of the engine mount are switched to the first spring characteristics so as to curb transmission of engine vibration to the vehicle side.

On the other hand, when the engine speed is lower than the predetermined rotational speed, engine vibration is reduced as torque of the engine is smaller; therefore, the occupant of the vehicle does not feel uncomfortable even if the engine vibration is transmitted to the vehicle side. In view of this fact, when the engine speed is lower than the predetermined rotational speed, and the torque of the engine is smaller than the predetermined torque, a greater emphasis is placed on damping of vibration transmitted from the road surface to the vehicle side, than reduction of engine vibration transmitted to the vehicle side, and the spring characteristics of the engine mount are switched to the second spring characteristics.

There is a frequency region in which vibration transmitted from the road surface to the vehicle side during traveling of the vehicle resonates with vibration of the engine itself, in a region where the engine speed is lower than the predetermined rotational speed, namely, in a region where the frequency of engine vibration is low. Nonetheless, the spring characteristics of the engine mount are switched to the second spring characteristics as described above, so that the engine mount provides a large damping coefficient in the region where the frequency is low. Thus, if the damping coefficient of the engine mount is increased in the low frequency region, the engine mount can effectively suppress resonance of the vibration transmitted from the road surface to the vehicle, and the vibration of the engine itself, and the occupant is less likely or unlikely to feel uncomfortable due to the resonance.

In the suspension system for the engine according to the above aspect, the electronic control unit may be configured to switch the spring characteristics of the engine mount to the first spring characteristics when the rotational speed of the engine is lower than the predetermined rotational speed, the torque of the engine is smaller than the predetermined torque, and a traveling speed of the vehicle is lower than a predetermined vehicle speed.

When the traveling speed of the vehicle is low, vibration is less likely to be transmitted from the road surface to the vehicle side, and resonance between the vibration and vibration of the engine is less likely to occur; therefore, the occupant is not significantly affected by the resonance. Accordingly, when the traveling speed of the vehicle is lower than the predetermined vehicle speed, it is preferable to place a higher priority on reduction of engine vibration transmitted to the vehicle side, than damping of vibration transmitted from the road surface to the vehicle side. In other words, when the traveling speed of the vehicle is lower than the predetermined vehicle speed, it is preferable to switch the spring characteristics of the engine mount to the first spring characteristics, even under the situation where the second spring characteristics are normally selected as the spring characteristics of the engine mount, namely, under the situation where the engine speed is lower than the predetermined rotational speed, and the torque of the engine is smaller than the predetermined torque. According to the above-described arrangement, the spring characteristics can be switched in this manner.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
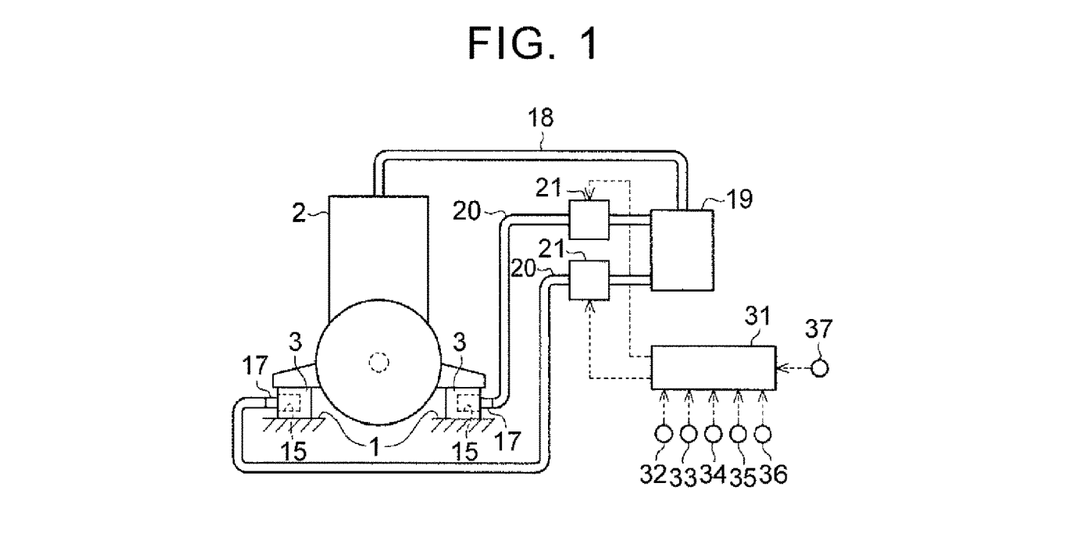
FIG. 1 a schematic view showing the overall configuration of a suspension system for an engine.
Figure 2:
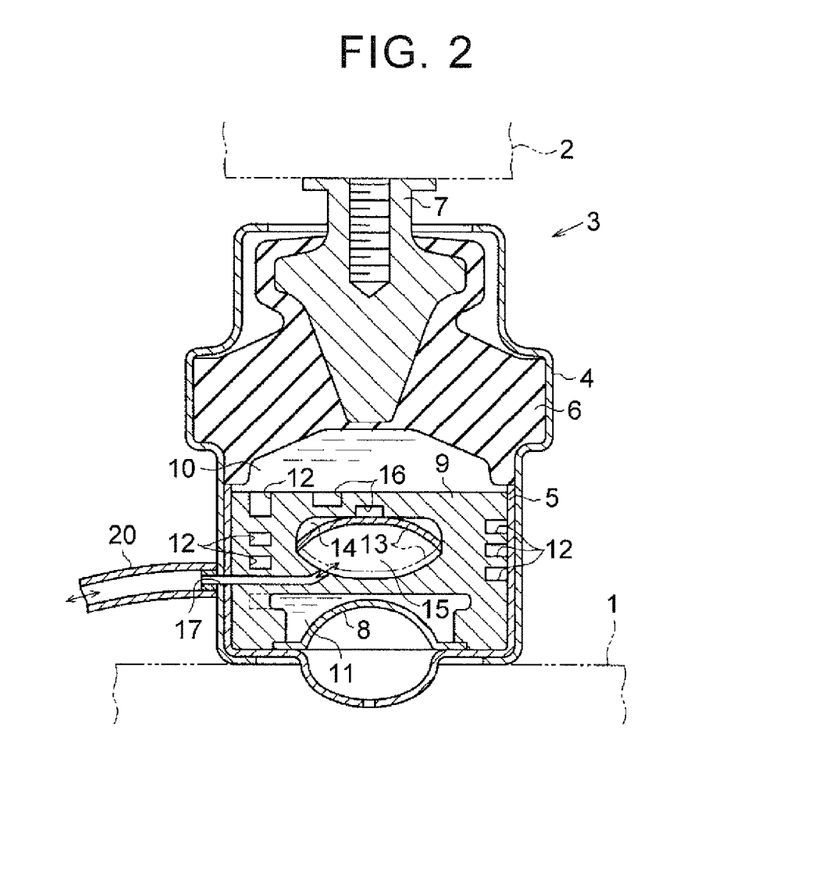
FIG. 2 is a cross-sectional view showing the internal structure of an engine mount in the system of FIG. 1.
Figure 3:
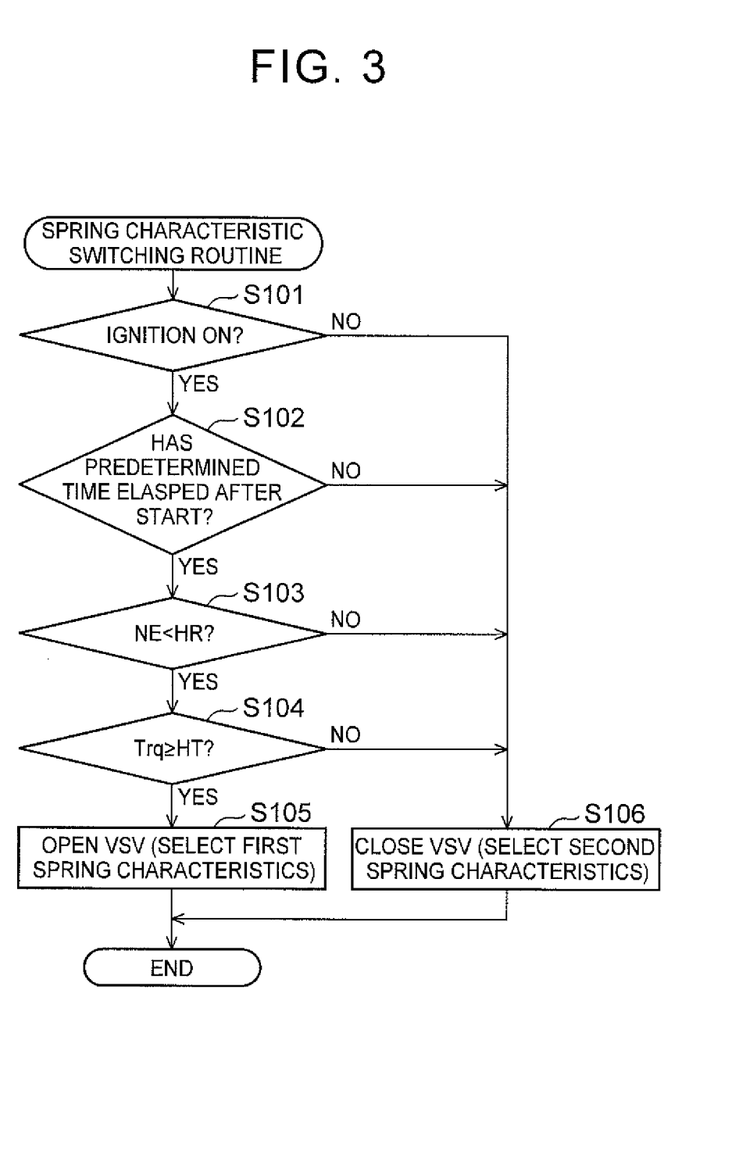
FIG. 3 is a flowchart illustrating a procedure of switching spring characteristics of the engine mount.

Referring to FIG. 1 through FIG. 3, a suspension system for an engine in a vehicle according to a first embodiment will be described.

The suspension system shown in FIG. 1 includes engine mounts 3 that support an engine 2 on a vehicle 1. The engine mounts 3 have the function of curbing transmission of vibration of the engine 2 (which will be called "engine vibration") to the vehicle 1 side during operation of the engine 2, and damping vibration transmitted from a road surface to the vehicle 1 during traveling of the vehicle 1. The engine mount 3 has a higher capability of curbing transmission of engine vibration to the vehicle 1 side as the spring constant k of the engine mount 3 is smaller. On the other hand, the engine mount 3 has a higher capability of damping vibration transmitted from the road surface to the vehicle as the damping coefficient c of the engine mount 3 is larger.

FIG. 2 is a cross-sectional view showing the internal structure of the engine mount 3. The engine mount 3 includes a generally cylindrical main body case 4 that is open at its upper and lower ends as viewed in FIG. 2, a lower cover 5 that closes the lower end of the main body case 4, and a rubber base 6 fixed to an upper portion of an inner circumferential surface of the main body case 4. The main body case 4 and the lower cover 5 are fixed to the vehicle 1. On the other hand, a mounting bracket 7 is fixed to the rubber base 6. The mounting bracket 7 protrudes from the upper end of the main body case 4, and is fixed to the engine 2. Accordingly, the engine mount 3, when it is supported on the vehicle 1, receives a load from the engine 2.

A lower diaphragm 8 is provided in a bottom portion (lower portion in FIG. 2) of the lower cover 5. The space between the lower diaphragm 8 and the rubber base 6 in the interior of the main body case 4 and the lower cover 5 is divided by an intermediate body 9 into an upper liquid chamber 10 and a lower liquid chamber 11. The intermediate body 9 is a rigid body that is fixed to an upper portion of an inner circumferential surface of the lower cover 5. The upper liquid chamber 10 and the lower liquid chamber 11 are filled with liquid. A first orifice 12 that communicates with the upper liquid chamber 10 and the lower liquid chamber 11 is formed in an outer circumferential portion of the intermediate body 9. When the relative positions of the vehicle 1 and the engine 2 change due to vibration of at least one of the vehicle 1 and the engine 2, the rubber base 6 deforms according to the change in the positions, and the liquid flows between the upper liquid chamber 10 and the lower liquid chamber 11 via the first orifice 12, due to the deformation of the rubber base 6.

The interior of the intermediate body 9 includes a hollow, and the hollow is divided by an intermediate diaphragm 13 into an intermediate liquid chamber 14 and an air chamber 15. The intermediate liquid chamber 14 communicates with the upper liquid chamber 10 via a second orifice 16 formed in the intermediate body 9, and is filled with liquid, like the upper liquid chamber 10. On the other hand, the air chamber 15 is connected to a feed/discharge passage 17 formed in the intermediate body 9, lower cover 5, and the main body case 4. If air is drawn from the air chamber 15 through the feed/discharge passage 17, and the pressure in the air chamber 15 is reduced to a value that is lower by a given amount than the atmospheric pressure, the intermediate diaphragm 13 is deformed as indicated by a two-dot chain line in FIG. 2, based on a difference between the pressure in the air chamber 15 and the pressure in the intermediate liquid chamber 14, so as to reduce the volume of the air chamber 15 (or increase the volume of the intermediate chamber 14).

If the air stops being drawn from the air chamber 15 through the feed/discharge passage 17, and the pressure in the air chamber 15 is increased to a level around the atmospheric pressure, the difference between the pressure in the air chamber 15 and the pressure in the intermediate liquid chamber 14 is reduced, and the intermediate diaphragm 13 returns to the original position as indicated by a solid line in FIG. 2, due to the elasticity of the intermediate diaphragm 13 itself. When the intermediate diaphragm 13 is located at the position as indicated by the solid line, an end portion of the second orifice 16 which faces the intermediate liquid chamber 14 is closed or blocked by the intermediate diaphragm 13. On the other hand, when the intermediate diaphragm 13 is displaced or moved to the position as indicated by the two-dot chain line, the end portion of the second orifice 16 which faces the intermediate liquid chamber 14 is opened, through the displacement of the intermediate diaphragm 13.

In the condition where the end portion of the second orifice 16 facing the intermediate liquid chamber 14 is closed by the intermediate diaphragm 13, namely, in the condition as indicated by the solid line in FIG. 2, the liquid does not flow between the upper liquid chamber 10 and the intermediate liquid chamber 14 via the second orifice 16, even if the rubber base 6 deforms due to vibration of at least one of the vehicle 1 and the engine 2. On the other hand, in the condition where the end portion of the second orifice 16 facing the intermediate liquid chamber 14 is open to the chamber 14, namely, in the condition where the intermediate diaphragm 13 is displaced as indicated by the two-dot chain line in FIG. 2, the liquid flows between the upper liquid chamber 10 and the intermediate liquid chamber 14 via the second orifice 16 when the rubber base 6 deforms due to vibration of at least one of the vehicle 1 and the engine 2.

Accordingly, the spring characteristics of the engine mount 3 are switched, depending on the presence or absence of flow of the liquid through the second orifice 16, between the time when the intermediate diaphragm 13 is placed in the condition as indicated by the solid line in FIG. 2, with the air being kept from being drawn from the air chamber 15, and the time when the intermediate diaphragm 13 is displaced as indicated by the two-dot chain line in FIG. 2, with the air being drawn from the air chamber 15.

In this embodiment, the first orifice 12, lower diaphragm 8, etc. of the engine mount 3 are tuned so that, when the intermediate diaphragm 13 is placed in the condition as indicated by the solid line in FIG. 2, with the air being kept from being drawn from the air chamber 15, the engine mount 3 provides the above-indicated second spring characteristics with which the frequencies of engine vibration (engine speeds) at which the spring constant K and the damping coefficient c reach their maximum values are low (7-20 Hz), as shown in FIG. 6. Also, the second orifice 16, etc. of the engine mount 3 are tuned so that, when the intermediate diaphragm 13 is displaced as indicated by the two-dot chain line in FIG. 2, with the air being drawn from the air chamber 15, the engine mount 3 provides the above-indicated first spring characteristics with which the frequencies of engine vibration (engine speeds) at which the spring constant K and the damping coefficient c reach their maximum values are high (around 1200 rpm).

When the spring characteristics of the engine mount 3 are set to the first spring characteristics, namely, when the intermediate diaphragm 13 is displaced as indicated by the two-dot chain line in FIG. 2, the spring constant k and damping coefficient c of the engine mount 3 change as indicated in FIG. 5 as the frequency of engine vibration becomes higher with increase of the engine speed. As is understood from FIG. 5, when the spring characteristics of the engine mount 3 are set to the first spring characteristics, the frequency at which the spring constant k is maximized and the frequency at which the damping coefficient c is maximized are close to each other, and these frequencies are higher than those of the second spring characteristics.

When the spring characteristics of the engine mount 3 are set to the second spring characteristics, namely, when the intermediate diaphragm 13 is placed in the position as indicated by the solid line of FIG. 2, the spring constant k and damping coefficient c of the engine mount 3 change as indicated in FIG. 6 as the frequency of engine vibration becomes higher with increase of the engine speed. As is understood from FIG. 6, when the spring characteristics of the engine mount 3 are set to the second spring characteristics, the frequency at which the spring constant k is maximized and the frequency at which the damping coefficient c is maximized are close to each other, and these frequencies are lower than those of the first spring characteristics.

Next, the structure for drawing air from the air chamber 15 of the engine mount 3 will be described. As shown in FIG. 1, the suspension system includes a negative pressure tank 19 connected to the downstream side of a throttle valve in an intake passage of the engine 2 via a pipe 18. If a negative pressure is developed on the downstream side of the throttle valve in the intake passage through a closing action of the throttle valve, the air in the negative pressure tank 19 is drawn into the intake passage through the pipe 18, based on the negative pressure, so that the pressure in the negative pressure tank 19 becomes lower than the atmospheric pressure. The negative pressure tank 19 is arranged to hold the interior of the tank 19 in a negative-pressure condition even when the throttle valve is open.

The negative pressure tank 19 is connected to the feed/discharge passage 17 of each of the engine mounts 3 via a feed/discharge pipe 20. Also, a vacuum switching valve (VSV) 21 is provided in the feed/discharge pipe 20. The VSV 21 is operable to be opened and closed so as to communicate the feed/discharge passage 17 of the engine mount 3 with the negative pressure tank 19 and disconnect the passage 17 from the tank 19. When the VSV 21 is opened, the feed/discharge passage 17 communicates with the negative pressure tank 19, and the air is drawn from the air chamber 15 of the engine mount 3 via the feed/discharge passage 17 based on the negative pressure in the negative pressure tank 19. When the VSV 21 is closed, the feed/discharge passage 17 and the negative pressure tank 19 are disconnected from each other, and the air is inhibited from being drawn from the air chamber 15 via the feed/discharge passage 17 under the negative pressure in the negative pressure tank 19.

Accordingly, the spring characteristics of the engine mount 3 are set to the second spring characteristics in the condition where the VSV 21 is closed and the air is inhibited from being drawn from the air chamber 15, whereas the spring characteristics of the engine mount 3 are set to the first spring characteristics in the condition where the VSV 21 is opened and the air is drawn from the air chamber 15. The pipe 18, negative pressure tank 19, feed/discharge pipes 20, and the VSVs 21 provided in the suspension system function as a switching unit for switching the spring characteristics of the engine mounts 3 between the first spring characteristics and the second spring characteristics.

Next, the electric configuration of the suspension system will be described. The suspension system includes an electronic control unit 31 that performs various operation controls of the engine 2. The electronic control unit 31 is provided with a CPU that performs various computations concerned with the above-mentioned various operation controls, a ROM in which programs and data needed for the controls are stored, a RAM in which computation results of the CPU, etc. are temporarily stored, input and output ports for receiving signals from the outside and transmitting signals to the outside, and so forth.

Various sensors, etc. as follows are connected to the input port of the electronic control unit 31. The sensors include an accelerator position sensor 32 that detects the accelerator operation amount, and a throttle position sensor 33 that detects the throttle opening amount.

The sensors also include an air flow meter 34 that detects the intake air amount of the engine 2, a rotational speed sensor 35 that detects the rotational speed of the engine 2 (the engine speed NE), a vehicle speed sensor 36 that detects the traveling speed of the vehicle 1 (vehicle speed SPD), and an ignition switch 37 operated by the driver.

To the output port of the electronic control unit 31 are connected drive circuits of various equipment or devices, such as the throttle valve, injectors, and ignition plugs, for operating the engine 2, and drive circuits of the VSVs 21.

The electronic control unit 31 starts the engine 2 when the ignition switch 37 is manually turned on by the driver, and stops the engine 2 when the ignition switch 37 is manually turned off by the driver. Also, the electronic control unit 31 grasps operating conditions required of the engine 2 and the actual operating conditions of the engine 2, based on signals received from the above-indicated various sensors, and outputs command signals to various drive circuits connected to the output port, based on the required and actual operating conditions. In this manner, the electronic control unit 31 performs various operation controls of the engine 2, including throttle opening control, fuel injection control, and ignition timing control of the engine 2.

Next, the control for switching the spring characteristics of the engine mount 3 between the first spring characteristics and the second spring characteristics will be described. FIG. 3 is a flowchart illustrating a spring characteristic switching routine for performing the above switching control. The spring characteristic switching routine is periodically executed as an interrupt routine at given time intervals. The electronic control unit 31 functions as a controller that performs the switching control when it executes the spring characteristic switching routine.

In step S101 of the routine of FIG. 3, the electronic control unit 31 determines whether the ignition switch 37 has been turned ON by the driver. If an affirmative decision (YES) is made in step S101, the control proceeds to step S102. In step S102, the electronic control unit 31 determines whether a predetermined length of time (e.g., 1 sec.) has elapsed after the start of the engine 2, namely after the start of self-sustained operation of the engine 2. If an affirmative decision (YES) is made in step S102, the control proceeds to step S103.

In step S103, the electronic control unit 31 determines whether the engine speed NE is lower than a criterial value HR. The criterial value FIR is set based on a threshold value A (in this embodiment, 1200 rpm) and a hysteresis width A1. The criterial value HR is set to the threshold value A while the engine speed NE is increasing, and is set to a value (A−A1) obtained by subtracting the hysteresis width A1 from the threshold value A while the engine speed NE is decreasing. For example, a value of 50 rpm is used as the hysteresis width A1.

If it is determined in step S103 that the engine speed NE is lower than the criterial value HR, the control proceeds to step S104. In step S104, the electronic control unit 31 determines whether engine torque Trq is equal to or larger than a criterial value HT. The criterial value HT is set based on a threshold value B (in this embodiment, 40 N/m) and a hysteresis width B1. The criterial value HT is set to the threshold value B while engine torque Trq is decreasing, and is set to a value (B+B1) obtained by adding the hysteresis width B1 to the threshold value B while the engine torque Trq is increasing. For example, a value of 10 N/m is used as the hysteresis width B1.

The engine torque Trq used in step S104 can be obtained based on the engine load factor that represents the ratio of the engine load to the full load of the engine 2. Also, the engine load factor is obtained based on a parameter relating to the intake air amount of the engine 2, and the engine speed N. Examples of the parameter relating to the intake air amount of the engine 2 include the accelerator operation amount detected by the accelerator position sensor 32, throttle opening amount detected by the throttle position sensor 33, and the actual measurement value of the intake air amount detected by the air flow meter 34.

When it is determined in step S104 that the engine torque Trq is equal to or larger than the criterial value HT, the control proceeds to step S105. In step S105, the electronic control unit 31 causes the VSV 21 to be opened so as to set the spring characteristics of the engine mount 3 to the first spring characteristics. The spring characteristic switching routine then is finished. On the other hand, if it is determined in step S104 that the engine torque Trq is smaller than the criterial value HT, the control proceeds to step S106. In step S106, the electronic control unit 31 causes the VSV 21 to be closed so as to set the spring characteristics of the engine mount 3 to the second spring characteristics. The spring characteristic switching routine then is finished.

In the case where a negative decision (NO) is made in any of steps S101-S103, too, the control proceeds to step S106. Accordingly, when the engine speed NE is equal to or higher than the criterial value FIR (S103: NO), the VSV 21 is closed in step S106, so that the spring characteristics of the engine mount 3 are set to the second spring characteristics.

Next, the operation of the suspension system of the engine 2 will be described. In order to prevent an occupant from feeling uncomfortable because of engine vibration transmitted to the vehicle 1 side, it is desirable to enhance the NV (noise and vibration) performance of the engine mount 3 over the entire change region of the engine speed NE, in other words, reduce the spring constant k of the engine mount 3 over the entire change region of the engine speed NE. To achieve this, it may be considered to switch the spring characteristics of the engine mount 3 to the first spring characteristics (FIG. 5) when the engine speed NE is lower than the criterial value HR, and switch the spring characteristics of the engine mount 3 to the second spring characteristics (FIG. 6) when the engine speed NE is equal to or higher than the criterial value HR.

However, in a region where the engine speed NE is lower than the criterial value HR, namely, in a region where the frequency of engine vibration is low, there is a frequency region (7-20 Hz in the example of FIGS. 5 and 6) in which the vibration transmitted from a road surface to the vehicle 1 side resonates with vibration of the engine 2 itself during traveling of the vehicle 1. In order to make it less likely or unlikely for the occupant of the vehicle 1 to feel uncomfortable due to occurrence of the resonance, it is useful to increase the damping coefficient c of the engine mount 3, namely, to enhance the performance of the engine mount 3 or its capability of damping vibration transmitted from the road surface to the vehicle 1.

However, in the case where the spring characteristics of the engine mount 3 is set to the first spring characteristics as described above when the engine speed NE is lower than the criterial value HR, the damping coefficient c of the engine mount 3 is reduced in the frequency region in which the resonance occurs. Namely, the engine mount 3 has a reduced capability of damping vibration transmitted from the road surface to the vehicle 1. Therefore, when the engine speed NE is low, i.e., lower than the criterial value HR, resonance may occur in the above-mentioned frequency region (which will be called "resonance frequency region"), and the occupant of the vehicle 1 may feel uncomfortable due to the resonance.

To solve the above problem, the electronic control unit 31 switches the spring characteristics of the engine mount 3 between the first spring characteristics and the second spring characteristics, according to the engine torque Trq, when the engine speed NE is lower than the criterial value HR.

More specifically, when the engine speed NE is lower than the criterial value HR, and the engine torque Trq is equal to or larger than the criterial value HT, the electronic control unit 31 causes the VSV 21 to be opened so as to switch the spring characteristics of the engine mount 3 to the first spring characteristics. Also, when the engine speed NE is lower than the criterial value HR, and the engine torque Trq is smaller than the criterial value HT, the electronic control unit 31 causes the VSV 21 to be closed so as to switch the spring characteristics of the engine mount 3 to the second spring characteristics with which the damping coefficient c and the spring constant k are larger than those of the first spring characteristics.

When the engine speed NE is lower than the criterial value HR, engine vibration increases as the engine torque Trq is larger. In order to prevent the occupant of the vehicle 1 from feeling uncomfortable due to the engine vibration transmitted to the vehicle 1 side at this time, the electronic control unit 31 switches the spring characteristics of the engine mount 3 to the first spring characteristics so as to curb transmission of the engine vibration to the vehicle 1 side, when the engine speed NE is lower than the criterial value HR, and the engine torque Trq is equal to or larger than the criterial value HT.

On the other hand, when the engine speed NE is lower than the criterial value HR, engine vibration is reduced as the engine torque Trq is smaller; therefore, the occupant of the vehicle 1 does not feel uncomfortable even if the engine vibration is transmitted to the vehicle 1 side. In view of this fact, when the engine speed NE is lower than the criterial value HR, and the engine torque Trq is smaller than the criterial value HT, the spring characteristics of the engine mount 3 are switched to the second spring characteristics, with a greater emphasis placed on damping of vibration transmitted from a road surface to the vehicle 1 side, than reducing engine vibration transmitted to the vehicle 1 side.

If the spring characteristics of the engine mount 3 are switched to the second spring characteristics (FIG. 6) according to the engine torque Trq as described above, in the region where the engine speed NE is lower than the criterial value HR, namely, in the region where the frequency of engine vibration is low, the damping coefficient c of the engine mount 3 is increased in the above-indicated resonance frequency region (7-20 Hz in the example of FIG. 6). Thus, it is possible for the engine mount 3 to effectively reduce resonance of the vibration transmitted from the road surface to the vehicle 1 and the vibration of the engine 2 itself, and thereby make it less likely or unlikely for the occupant to feel uncomfortable due to the resonance.

According to this embodiment as described above in detail, the following effect can be obtained. (1) The occupant is less likely or unlikely to feel uncomfortable because of resonance of vibration transmitted from the road surface to the vehicle 1 and vibration of the engine 2, in the region where the engine speed NE is lower than the criterial value HR.

Figure 4:
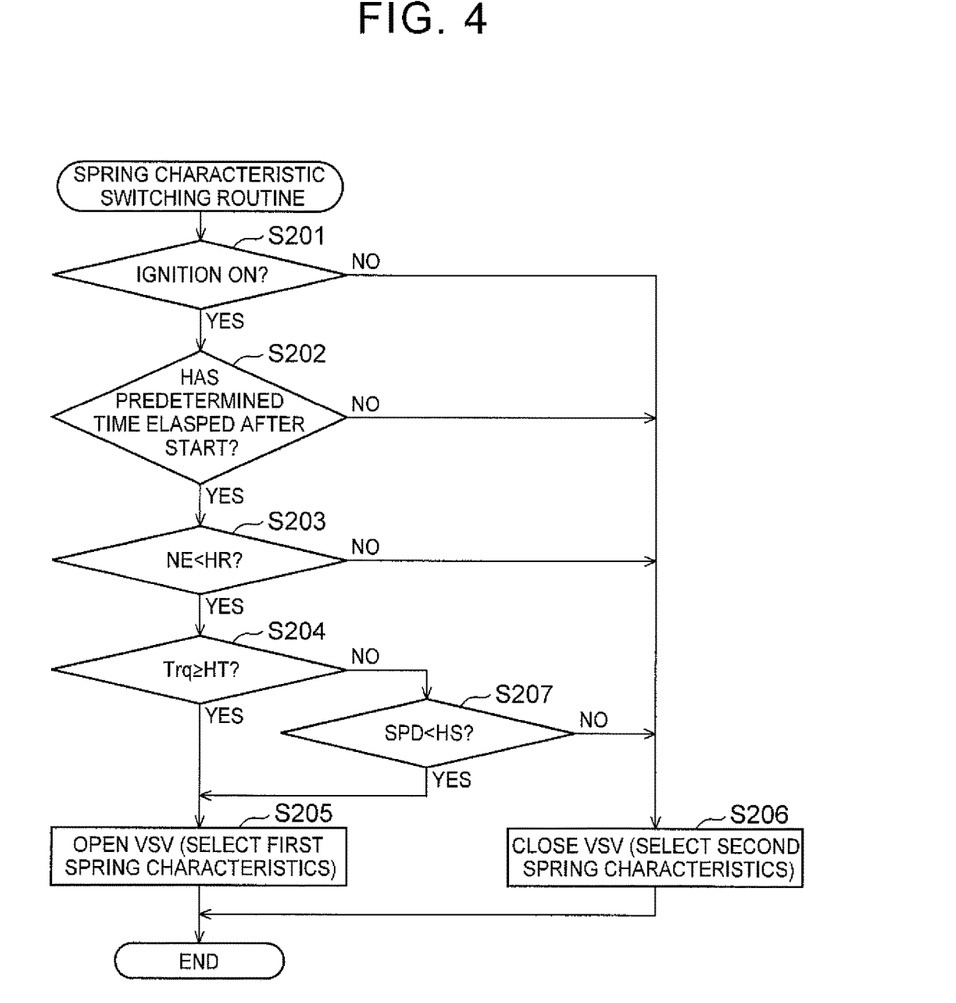
FIG. 4 is a flowchart illustrating a procedure of switching spring characteristics of the engine mount.

Next, a second embodiment will be described with reference to FIG. 4. FIG. 4 is a flowchart illustrating a spring characteristic switching routine of this embodiment. In this spring characteristic switching routine, step S207 is added to a process (S201-S206) corresponding to the process of steps S101-S106 of the spring characteristic switching routine of the first embodiment.

The electronic control unit 31 makes respective determinations as follows in steps S201-S204 of the spring characteristic switching routine of FIG. 4. Specifically, the electronic control unit 31 determines whether the ignition switch 37 has been turned ON (S201), determines whether a predetermined length of time has elapsed after completion of start-up (S202), determines whether the engine speed NE is lower than a criterial value HR (S203), and determines whether engine torque Trq is equal to or larger than a criterial value HT (S204).

If it is determined in step S204 that the engine torque Trq is equal to or larger than the criterial value HT, the electronic control unit 31 sets the spring characteristics of the engine mount 3 to the first spring characteristics, by opening the VSV 21 in step S205. If a negative decision (NO) is made in any of steps S201-S203, the electronic control unit 31 sets the spring characteristics of the engine mount 3 to the second spring characteristics, by closing the VSV 21 in step S206.

If a negative decision (NO) is made in step S204, namely, when it is determined that the engine torque Trq is smaller than the criterial value HT, the control proceeds to step S207. In step S207, the electronic control unit 31 determines whether the vehicle speed SPD is lower than a criterial value HS. The criterial value HS is set based on a threshold value C (in this embodiment, 10 km/h) and a hysteresis width C1. The criterial value HS is set to the threshold value C while the vehicle speed SPD is decreasing, and is set to a value (C−C1) obtained by subtracting the hysteresis width C1 from the threshold value C while the vehicle speed SPD is increasing. For example, a value of 5 km/h is used as the hysteresis width C1.

If it is determined in step S207 that the vehicle speed SPD is lower than the criterial value HS, the control proceeds to step S205. If it is determined in step S207 that the vehicle speed SPD is equal to or higher than the criterial value HS, the control proceeds to step S206. After one of these steps S205 and S206 is executed, the electronic control unit 31 finishes the spring characteristic switching routine. With step S207 thus added to the routine, even when the engine speed NE is lower than the criterial value HR (S203: YES), and the engine torque Trq is smaller than the criterial value HT (S204: NO), the VSV 21 is opened and the spring characteristics of the engine mount 3 are switched to the first spring characteristics (S205) if the vehicle speed SPD is lower than the criterial value HS.

According to this embodiment, the following effect can be obtained, in addition to the effect of the first embodiment.

(2)) When the engine speed NE is lower than the criterial value HR, and the engine torque Trq is smaller than the criterial value HT, the electronic control unit 31 switches the spring characteristics of the engine mount 3 to the first spring characteristics, under the condition that the vehicle speed SPD is lower than the criterial value HS. When the vehicle speed SPD is low, vibration is less likely to be transmitted from the road surface to the vehicle 1 side, and resonance is less likely to occur between the vibration and the vibration of the engine 2; therefore, the occupant is not significantly affected by the resonance. Accordingly, when the vehicle speed SPD is low, it is preferable to place a higher priority on reduction of engine vibration transmitted to the vehicle 1 side, than damping of vibration transmitted from the road surface to the vehicle 1 side. In other words, when the vehicle speed SPD is low, it is preferable to switch the spring characteristics of the engine mount 3 to the first spring characteristics, even under the situation where the second spring characteristics are normally selected as the spring characteristics of the engine mount 3, namely, under the situation where the engine speed NE is lower than the criterial value HR, and the engine torque Trq is smaller than the criterial value HT. This can be achieved according to the second embodiment.

Each of the above-described embodiments may be modified as follows, for example. The VSV 21 is not necessarily required to operate using a negative pressure, but may operate electrically, rather than using the negative pressure.

While 1200 rpm is employed as an example of the threshold value A, this value may be changed as needed to another different value. While 40 N/m is employed as an example of the threshold value B, this value may be changed as needed to another different value.

While 10 km/h is employed as an example of the threshold value C, this value may be changed as needed to another different value. While 50 rpm is employed as an example of the hysteresis width A1, this value may be changed as needed to another different value.

While 10 N/m is employed as an example of the hysteresis width B1, this value may be changed as needed to another different value. While 5 km/h is employed as an example of the hysteresis width C1, this value may be changed as needed to another different value.

The hysteresis widths A1, B1, C1 are not necessarily required to be set. Namely, the hysteresis widths A1, B1, C1 may be set to "0", thereby to be eliminated.

What is claimed is:

1. A suspension system for an engine, the suspension system comprising:
   an engine mount that supports the engine on a vehicle, the engine mount having spring characteristics that are switchable between first spring characteristics and second spring characteristics, the second spring characteristics providing a larger damping coefficient and a larger spring constant than the first spring characteristics when a rotational speed of the engine is lower than a predetermined rotational speed; and
   an electronic control unit configured to switch the spring characteristics of the engine mount to the first spring characteristics when the rotational speed of the engine is lower than the predetermined rotational speed, and torque of the engine is equal to or larger than a predetermined torque, the electronic control unit being configured to switch the spring characteristics of the engine mount to the second spring characteristics when the rotational speed of the engine is lower than the predetermined rotational speed, and the torque of the engine is smaller than the predetermined torque,
   wherein the predetermined rotational speed is a rotational speed of the engine below which a frequency of engine vibration is within a resonance frequency region.

2. The suspension system according to claim 1, wherein the electronic control unit is configured to switch the spring characteristics of the engine mount to the first spring characteristics when the rotational speed of the engine is lower than the predetermined rotational speed, even when the torque of the engine is smaller than the predetermined torque, when a traveling speed of the vehicle is lower than a predetermined vehicle speed.

3. The suspension system according to claim 1, wherein the electronic control unit is configured to switch the spring characteristics of the engine mount to the second spring characteristics when the rotational speed of the engine is equal to or greater than the predetermined rotational speed.

4. The suspension system according to claim 1, wherein the engine mount includes a diaphragm that is movable between a first position to provide the engine mount with the first spring characteristics and a second position to provide the engine mount with the second spring characteristics, and the electronic control unit controls movement of the diaphragm between the first and second positions.

5. The suspension system according to claim 1, wherein a value of the predetermined rotational speed is changed depending on whether the engine speed is increasing or decreasing.

6. The suspension system according to claim 1, wherein a value of the predetermined torque is changed depending on whether the torque of the engine is increasing or decreasing.

7. The suspension system according to claim 2, wherein a value of the predetermined vehicle speed is changed depending on whether the traveling speed of the vehicle is increasing or decreasing.

8. A method of controlling a suspension system for an engine of a vehicle, the suspension system including an engine mount that supports the engine on the vehicle, the engine mount having spring characteristics that are switchable between first spring characteristics and second spring characteristics, the second spring characteristics providing a larger damping coefficient and a larger spring constant than the first spring characteristics when a rotational speed of the engine is lower than a predetermined rotational speed, the method comprising:

controlling the spring characteristics of the engine mount with an electronic control unit so as to
(i) switch the spring characteristics of the engine mount to the first spring characteristics when the rotational speed of the engine is lower than the predetermined rotational speed, and torque of the engine is equal to or larger than a predetermined torque, and
(ii) switch the spring characteristics of the engine mount to the second spring characteristics when the rotational speed of the engine is lower than the predetermined rotational speed, and the torque of the engine is smaller than the predetermined torque, wherein the predetermined rotational speed is a rotational speed of the engine below which a frequency of engine vibration is within a resonance frequency region.

9. The method according to claim 8, wherein
the electronic control unit switches the spring characteristics of the engine mount to the first spring characteristics when the rotational speed of the engine is lower than the predetermined rotational speed, even when the torque of the engine is smaller than the predetermined torque, when a traveling speed of the vehicle is lower than a predetermined vehicle speed.

10. The method according to claim 8, wherein
the electronic control unit switches the spring characteristics of the engine mount to the second spring characteristics when the rotational speed of the engine is equal to or greater than the predetermined rotational speed.

11. The method according to claim 8, wherein
the engine mount includes a diaphragm that is movable between a first position to provide the engine mount with the first spring characteristics and a second position to provide the engine mount with the second spring characteristics, and the electronic control unit controls movement of the diaphragm between the first and second positions.

12. The method according to claim 8, wherein
a value of the predetermined rotational speed is changed depending on whether the engine speed is increasing or decreasing.

13. The method according to claim 8, wherein
a value of the predetermined torque is changed depending on whether the torque of the engine is increasing or decreasing.

14. The method according to claim 9, wherein
a value of the predetermined vehicle speed is changed depending on whether the traveling speed of the vehicle is increasing or decreasing.

* * * * *